United States Patent
Nasser

(10) Patent No.: US 7,022,385 B1
(45) Date of Patent: Apr. 4, 2006

(54) LAMINATED IMAGED RECORDING MEDIA

(75) Inventor: Nabil Nasser, Woodbury, MN (US)

(73) Assignee: NuCoat, Inc., Plymouth, MN (US)

( * ) Notice: Subject to any disclaimer, the term of this patent is extended or adjusted under 35 U.S.C. 154(b) by 25 days.

(21) Appl. No.: 10/264,848

(22) Filed: Oct. 4, 2002

Related U.S. Application Data

(60) Provisional application No. 60/326,684, filed on Oct. 4, 2001.

(51) Int. Cl.
  *B41M 5/40* (2006.01)
(52) U.S. Cl. ............... 428/32.17; 428/32.21; 428/32.22; 428/32.26; 428/32.39
(58) Field of Classification Search ............. 428/32.17, 428/32.21, 32.22, 32.26, 32.39
  See application file for complete search history.

(56) References Cited

U.S. PATENT DOCUMENTS

| | | | | |
|---|---|---|---|---|
| 3,158,494 A | 11/1964 | Elkvar et al. | ............... | 428/207 |
| 4,098,952 A | 7/1978 | Kelly et al. | ............... | 428/483 |
| 4,371,582 A | 2/1983 | Sugiyama et al. | ....... | 428/32.23 |
| 4,578,285 A | 3/1986 | Viola | ....................... | 428/32.23 |
| 4,966,804 A | 10/1990 | Hasegawa et al. | .......... | 428/203 |
| 5,022,947 A | 6/1991 | Hasegawa et al. | .......... | 156/277 |
| 5,302,575 A * | 4/1994 | Nogawa et al. | ............. | 503/227 |
| 5,470,817 A | 11/1995 | Nakamura et al. | .......... | 251/200 |
| 5,470,818 A | 11/1995 | Nakamura et al. | ............. | 74/54 |
| 5,494,960 A | 2/1996 | Rolando et al. | ............ | 524/591 |
| 5,637,639 A | 6/1997 | Duan et al. | .................. | 524/591 |
| 5,670,448 A * | 9/1997 | Kometani | .................... | 503/227 |
| 5,691,425 A | 11/1997 | Klein et al. | .................. | 525/455 |
| 5,693,410 A | 12/1997 | Malhotra et al. | ......... | 428/32.13 |
| 6,143,419 A | 11/2000 | Hanada et al. | ............. | 428/32.1 |
| 6,177,181 B1 * | 1/2001 | Hamada et al. | .......... | 428/304.4 |
| 6,225,381 B1 | 5/2001 | Sharma et al. | ................ | 524/35 |
| 6,372,689 B1 * | 4/2002 | Kuga et al. | ................. | 503/227 |
| 6,565,949 B1 * | 5/2003 | Wang et al. | ............. | 428/32.24 |
| 6,607,831 B1 * | 8/2003 | Ho et al. | ................. | 428/423.1 |
| 2004/0126508 A1 * | 7/2004 | Takeda | ...................... | 428/32.1 |

FOREIGN PATENT DOCUMENTS

| | | |
|---|---|---|
| JP | 92/02041 | 8/1997 |
| WO | WO 01/05600 A1 * | 1/2001 |

* cited by examiner

*Primary Examiner*—B. Shewareged
(74) *Attorney, Agent, or Firm*—Schwegman, Lundberg, Woessner & Kluth, P.A.

(57) ABSTRACT

The present invention provides a method for manufacturing an identification document that can contain both common information and unique information describing the specific document holder. The information is in the form of indicia applied by digital imaging means. The document itself is in the form of a laminated article having the information affixed to one or more internal layers. Attempt to gain access to these internally imaged layers causes the image to be sufficiently disrupted as to prevent modifying such images.

30 Claims, 2 Drawing Sheets

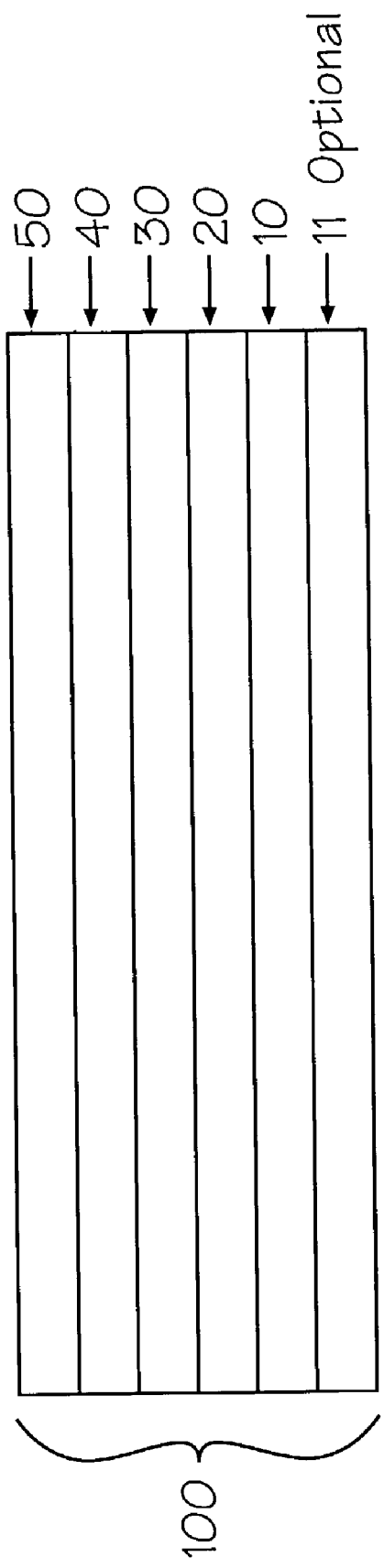
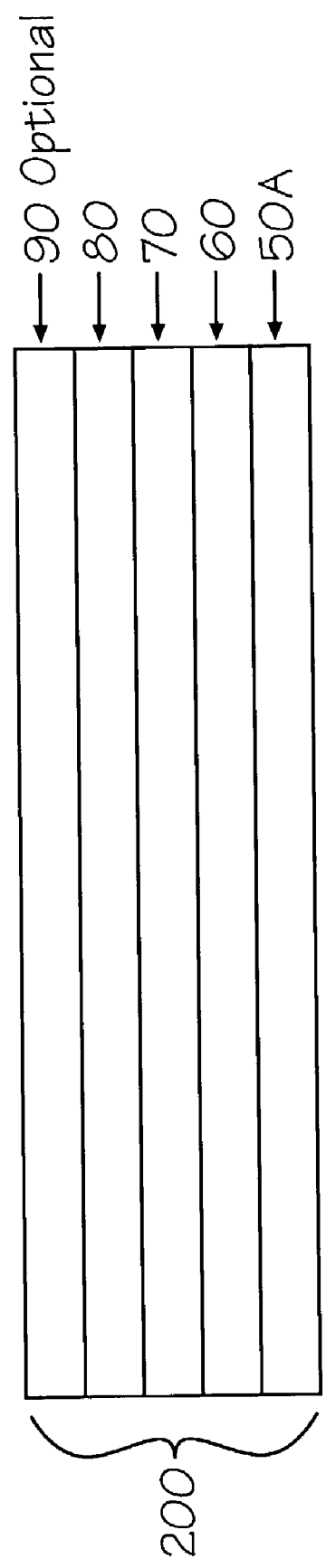

LAMINATED IMAGED RECORDING MEDIA

RELATED APPLICATIONS

This application claims priority from U.S. Provisional Patent Application Ser. No. 60/326,684, filed Oct. 4, 2001.

FIELD OF THE INVENTION

This invention relates to the process of laminating an imaged substrate and, more particularly, to a laminated ink-jet imaged article for identity preservation and falsification prevention.

BACKGROUND OF THE INVENTION

With the advent of computer controlled digital imaging techniques such as ink-jet or electrophotographic printing, it is now possible to mass-produce individualized printed copies. This has created many new markets for these imaging technologies. For example, labeling, bar coding, targeted advertising, and even individualized book publishing are now performed in this manner as opposed to standard printing techniques. Although this has obvious advantages for legitimate business, the same technology also allows for its misuse by permitting unauthorized duplication of original documents for the purpose of passing them off as original documents. For example, these imaging techniques have been used to generate false identity cards or counterfeit currency. To ensure valid, authentic documentation, additional security devices must be employed that will prevent accurate reproduction of original documentation so falsified documents can easily be detected either by eye or with low cost reading technologies.

Many types of identification cards and documents, such as driving licenses, national or government identification cards, bank cards, credit cards, controlled access cards and smart cards carry information relating to the identity of the bearer. The most important items of information are name, address, birth date, signature and photographic image. Additionally, the cards or documents may carry other variant data (i.e., data specific to a particular card or document, like an employee number, for example) and invariant data (i.e., data common to a large number of cards, like the name of an employer). All of the cards described above will hereinafter be generically referred to as "identification documents."

Commercial systems for issuing identification documents are of two main types, namely "on-the-spot" or "over-the-counter" (OTC) issue, and "central" issue. As the name implies, the former are issued immediately to a bearer who is present at a document-issuing station, whereas with the latter type, a bearer reports to a document station where data is collected, the data are forwarded to a central location where the card is produced, and the card is forwarded to the bearer, often by mail.

Centrally issued digital identification documents generally comprise an opaque laser or ink-jet printed core material, typically either paper or plastic, sandwiched between two layers of clear plastic laminate, typically polyester, to protect the aforementioned items of information from wear, exposure to the elements and tampering. The materials used in such centrally issued digital identification documents can offer the ultimate in durability. In addition, centrally issued digital identification documents generally offer a higher level of security than digital OTC identification documents because they have the ability to pre-print the laser or ink-jet printed core of the central issue document with "micro-printing," ultra-violet security features, security indicia, and other features currently unique to centrally issued identification documents.

The use of ink-jet technology to produce essentially permanent customized images for identity cards would seem to have potential, but several problems have remained. In particular, ink-jet imaged products have not provided highly water resistant or waterproof characteristics. Furthermore, ink-jet inks are prone to fade with time. Also, lamination of such products typically has caused image alteration due to melting of the image-receiving layer. Another limitation of the present protection technology is that delamination can be effected without destroying the image and therefore permitting modification or falsification of information.

Furthermore, it has been a general long-standing problem in the art to provide a recording sheet for ink-jet printing which is receptive to inks, allows the ink to dry quickly without running or smearing, provides sharp image quality and has very good water and humidity resistance which deters curling. Many attempts have been made to produce recording sheets for ink-jet printing which simultaneously have all of these properties.

U.S. Pat. No. 4,371,582, issued to Sugiyama et al. on Feb. 1, 1983 for INK-JET RECORDING SHEET describes an ink-jet recording sheet containing a basic latex polymer. U.S. Pat. No. 3,158,494, issued to Elkvar et al. on Nov. 24, 1964 for COATED POLYMERIC THERMOPLASTIC SHEET MATERIAL describes a polyurethane ink receptive surface. U.S. Pat. No. 5,693,410, issued to Malhotra et al. on Dec. 2, 1997 for INK-JET TRANSPARENCIES describes ink-jet recording transparencies having two coatings, namely a heat dissipating, fire resistant coating in contact with a substrate and a second ink receiving coating layer on the first layer comprising a hydrophilic binder, an ink spreading agent, a cationic component, a light-fastness inducing agent, a filler and a biocide. JP Pat. 92/02,041 describes ink-jet recording media having good ink drying properties comprising a substrate provided with at least one ink receiving layer which contains a reaction product of polyalkylene oxide with an isocyanate and a water insoluble cellulose compound. While the above ink-jet media may be suitable for intended purposes, there remains a need for a universal ink-jet media for a dye based ink system as well as a pigment based ink system. Further, there is a need for a universal ink-jet media useful for obtaining photographic quality prints by both thermal and piezo ink-jet printing technologies. Additionally, there remains a need for coatings for ink-jet media which have good water resistance and which can counter media curl due to humidity changes.

With regard to water resistance, significant effort has been expended on improving either the ink systems or the recording medium to achieve an image that will possess superior water resistance. Due to the interaction of the ink with the image-receiving layer it was not uncommon to create dedicated ink/substrate systems. Typically, one of the major advantages of the ink-jet imaging process is that the dyes employed are mainly water-soluble. Therefore, the system requires little or no organic solvent and is mainly water-based or aqueous media thereby creating a system that is environmentally friendly. However, this presents a significant design problem if, on the other hand, water resistance is required for the final imaged article. Inks utilizing pigments have been used to alleviate this problem since the pigments themselves are not water soluble and therefore after imaging will not run or bleed. However, the pigment particles generally, will not be absorbed into the image receiver layer, but rather reside on its surface and therefore can be easily removed by physical abrasion.

In U.S. Pat. No. 6,225,381, issued to Sharma et al. on May 1, 2001 for PHOTOGRAPHIC QUALITY INK-JET PRINTABLE COATING ink-jet printable-coated media that overcome the above-noted disadvantages the invention provides coating compositions that, when applied to suitable substrates such as transparent, translucent, or opaque white plastic films, paper, or the like, can achieve photographic quality prints by using any of a variety of ink-jet printers. The coating composition is compatible with dye based and pigment based ink systems, which can be printed both by thermal type ink-jet printers and piezo type ink-jet printers.

In U.S. Pat. No. 5,494,960, issued to Rolando et al. on Feb. 27, 1996 for AQUEOUS POLYURETHANE DISPERSIONS AND ADHESIVES BASED THEREON, aqueous polyurethane dispersions having anionic moieties which can be used in adhesives for manufacturing laminate structures with improved dispersion properties, which provide improved shelf-life stability of the dispersion and greater transparency and handling characteristics in application machinery for adhesives formulated therefrom, when a tertiary amine is present during an initial polyurethane prepolymer reaction between an isocyanate and a polyol component having acid functional groups are reported. The initial reaction is carried out prior to formation of the dispersion in water.

Polyurethanes having anionic moieties have been reported in U.S. Pat. No. 5,691,425, issued to Klein et al. on Nov. 25, 1997 for POLYURETHANE DISPERSIONS. Klein et al. disclose that their inventive polyurethane dispersions are suitable for diverse uses, for instance, in the preparation of coating systems, inter alia for coating wood, as binders for water-dilutable adhesives or as resins for printing inks.

Nakamura et al., in U.S. Pat. No. 5,470,818, issued on Nov. 28, 1995 for PRINTING SHEET COMPRISING A DYE RECEIVING LAYER MADE OF AN ISOCYANATE GROUP-CONTAINING POLYMER and U.S. Pat. No. 5,470,817, issued on Nov. 28, 1995 for PRINTING SHEET AND MANUFACTURING METHOD THEREFOR, report a printing sheet adapted for use in thermal transfer recording comprising a substrate (1) and a dye image-receiving layer (2) formed on the substrate. The layer (2) comprises an isocyanate group-containing polymer having at least one polysiloxane moiety and at least one urethane bond site therein. The isocyanate group-containing polymer is a reaction product between polyfunctional polyisocyanate compound and alcohol-modified silicone. A method for making such a sheet is also described. However, Nakamura et al. are concerned with optimizing a thermal ink receiving sheet that has low smearing by hand and acceptable writability. No mention is made of the need or desire to laminate this imaged material.

In U.S. Pat. No. 5,022,947, both issued to Hasegawa et al. on Jun. 11, 1991 for METHOD FOR THE PREPARATION OF A WATER-RESISTANT PRINTED MATERIAL, and U.S. Pat. No. 4,966,804, issued on Oct. 30, 1990 for PRINTED MATERIAL IMPARTED WITH IMPROVED WATER-PROOFNESS, a means to prepare a highly water-resistant printed material by the ink-jet printing method despite the water-solubility of the dye in the aqueous ink used in the ink-jet printing method is reported. The inventive method comprises overcoating the surface of the sheet material, which has a water-absorptive surface layer with receptivity of the aqueous ink and printed by the ink-jet printing method, with a curable polyisocyanate compound and bringing the overcoating layer under a condition capable of curing the polyisocyanate compound. This patent makes no reference to laminating the isocyanate layer to any other material. Rather the intent is to harden or cure the isocyanate to improve waterfastness.

In U.S. Pat. No. 4,578,285, issued to Michael S. Viola on Mar. 25, 1986 for INK-JET PRINTING SUBSTRATE, a printing substrate adapted to receive ink droplets to form an image generated by an ink-jet printer which comprises a transparent support carrying a layer comprising at least 70 weight percent polyurethane and 5 to 30 weight percent of a polymer selected from the group consisting of polyvinylpyrrolidone, polyvinylpyrrolidone/vinyl acetate copolymer, poly (ethyleneoxide), gelatin and polyacrylic acid is reported. No mention is made of subsequent lamination.

It is a general practice in conventional xerography to form electrostatic latent images on a xerographic surface by first uniformly charging a charge retentive surface such as a photoreceptor. The charged area is selectively dissipated in accordance with a pattern of activating radiation corresponding to original images. The selective dissipation of the charge leaves a latent charge pattern on the imaging surface corresponding to the areas not exposed by radiation.

This charge pattern is made visible by developing it with toner by passing the photoreceptor past one or more developer housings. In monochromatic imaging, the toner is generally comprised of black thermoplastic powder particles that adhere to the charge pattern by electrostatic attraction. The developed image is then fixed to the imaging surface or is transferred to a receiving substrate such as plain paper to which it is fixed by suitable fusing techniques.

The quality of color xerographic images on paper has approached the quality of color photographic prints. However, color xerographic prints fall short because they do not have the uniform gloss, dynamic range, or brilliance typical of photographic prints. Furthermore, xerographic prints do not have the feel of photographic prints because the paper used is usually too lightweight and limp.

Also the surface of color toner images is typically irregular, therefore providing a rather rough or lumpy appearance. The behavior of incident white light vis-a-vis such color images is believed to be as follows: some of the white light incident on the substrate carrying the color toner images specularly reflects off the substrate. Some of the light goes into the paper, scatters around, and comes back out in various directions. Some comes through the toner and some does not. Because the toner surface is rough or irregular some of the light incident thereon is reflected off the toner in various directions. Some of the light incident on the irregular toner surfaces passes through the toner into the paper and comes back out in various directions. White light becomes colored due to selective absorption as it passes through toner. The light then goes into the paper and back out through the toner whereby it becomes more colored through more absorption. Any white light that does not pass through the toner diminishes the appearance of the final print.

Attempts to make up for this deficiency in conventionally formed color toner images have led to the lamination of xerographic images on paper using a transparent substrate. This procedure has only been partially successful because the lamination process tends to reduce the density range of the print, resulting in a print that has less shadow detail. The lamination process also adds significant weight and thickness to the print.

Additionally, it is believed that the aforementioned lamination process does not produce good results because the color toner images at the interface between the laminate and the toner typically do not make suitable optical contact. That is to say, the initially irregular toner image at the interface is still irregular enough after lamination (i.e., contains voids) that light is reflected from at least some of those surfaces and is precluded from passing through the toner. In other words, when there are voids between the transparency and toner image, light gets scattered and reflected back without passing through the colored toner. Loss of image contrast results when any white light is scattered, either from the bottom surface of the transparent substrate or from the irregular toner surfaces and does not pass through the toner.

Digital OTC identification documents of the types mentioned above generally comprise highly plasticized poly (vinyl chloride) or have a composite structure with polyester laminated to highly plasticized 0.5–2.0 mil (13–51 μm) poly(vinyl chloride) film, which provides a suitable receiving layer for heat transferable dyes which form a photographic image, together with any variant or invariant data required for the identification of the bearer. These data are subsequently protected to varying degrees by clear, thin (0.125–0.250 mil, 3–6 μm) overlay patches applied at the printhead, holographic hot stamp foils (0.125–0.250 mil, 3–6 em), or a clear polyester laminate (0.5–10 mil, 13–254 μm) supporting common security features; these last two types of protective foil or laminate are applied at a laminating station separate from the printhead. The choice of laminate dictates the degree of durability and security imparted to the system in protecting the image and other data. Although such OTC documents are in wide use throughout the world, they suffer from several disadvantages. Both the highly plasticized poly(vinyl chloride) type and the polyester/poly(vinyl chloride) composite type become embrittled over time because of migration of the plasticizers, thus reducing the resistance of the document to cracking. Such cracking renders the card unusable and vulnerable to tampering.

The data described above which are crucial to the identification of the bearer are often covertly repeated on the document in encrypted form for data verification in a magnetic stripe, bar code, radio frequency module, or integrated circuit chip. The inability to retrieve such data due to cracking renders the document invalid. In addition, many of the polyester/poly(vinyl chloride) composite documents have exhibited extreme sensitivity to combinations of heat and humidity, as evidenced by delamination and curling of the document structure.

SUMMARY OF THE INVENTION

The present invention is designed to alleviate the foregoing problems associated with manufacturing a security identification card or badge using an imaging system such as an ink-jet printer or electrophotographic copier to obtain a card or badge that is essentially tamper resistant.

It is an object of this invention to provide a superior imaging system that will faithfully reproduce an image without distortion due to bleeding, running, or the like.

It is a further object of the invention to provide an image-receiving layer that can be imaged by a multitude of imaging processes and materials thereby eliminating the need for multiple inventories of recording sheets or recording sheets coated on both sides with media-specific formulations.

It is a still further object of the invention to provide a fast-drying image receiving layer that will allow for rapid reproductions without the potential for smudging of the image.

A still further object of the invention is to provide a process to laminate a protective coating onto the imaged surface without distorting the image itself or its receiver layer or substrate elements.

It is another object of the invention to provide an identification card that cannot be falsified by delamination, image modification and then reassembly.

BRIEF DESCRIPTION OF THE DRAWINGS

A complete understanding of the present invention may be obtained by reference to the accompanying drawings, when considered in conjunction with the subsequent detailed description, in which:

FIG. 1 is a cross-sectional representation of the first integral element;

FIG. 2, is a cross-sectional representation of the second integral element; and

DESCRIPTION OF THE PREFERRED EMBODIMENT

Figure 3:
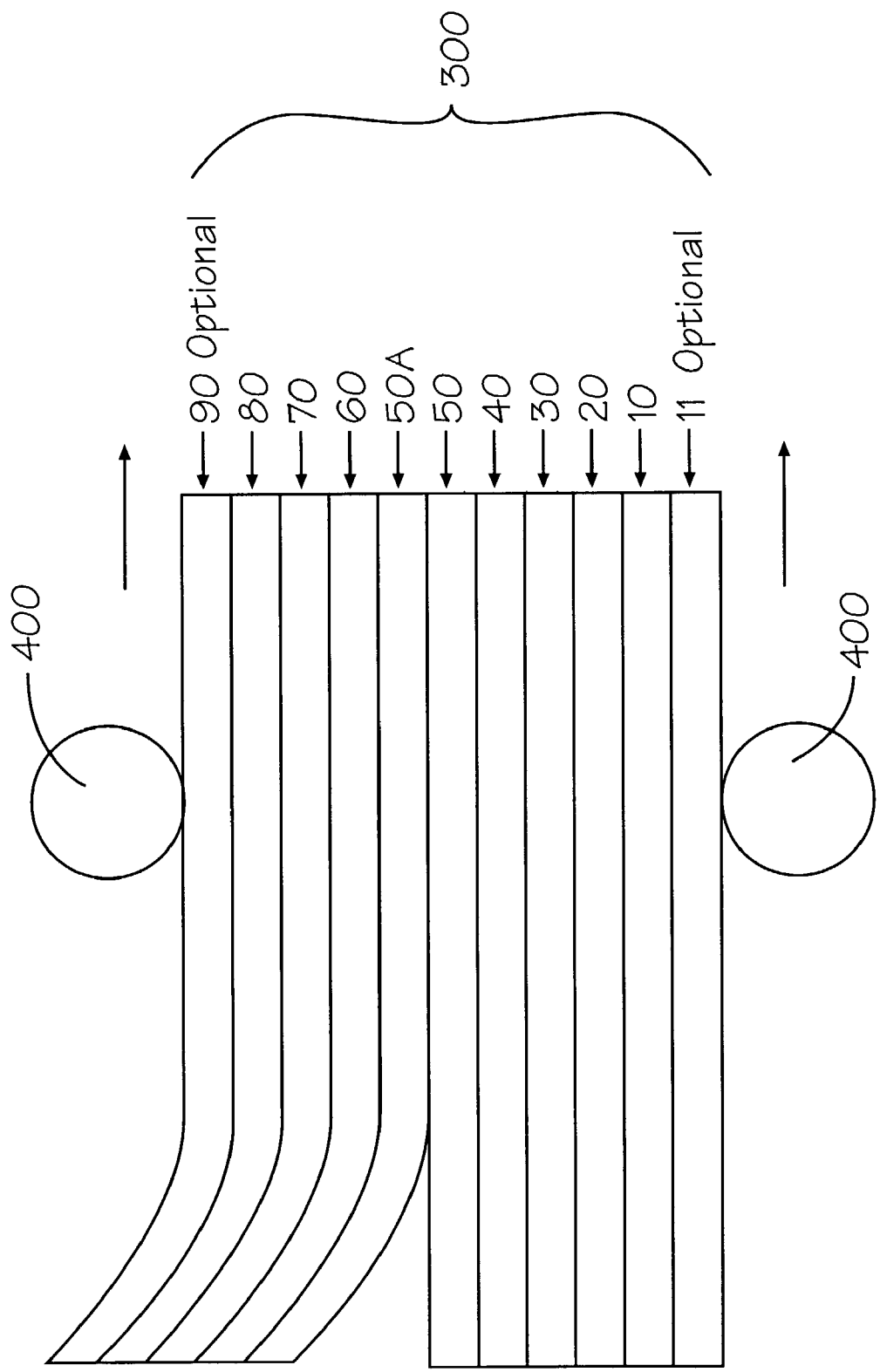
FIG. 3, is a cross-sectional representation of the two integral elements after the imaging and during the lamination process.

Generally speaking, a method is described for manufacturing an identification document that can contain both common and unique information describing the specific document holder. The present invention encompasses a process for manufacturing a recording media that is capable of being imaged by multiple imaging technologies and to generating an article that is designed to reduce the potential that it can later be illicitly duplicated or modified. Such imaging technologies include, but are not limited to, thermal transfer, ink-jet printing or plotting, screen printing, handwriting with ink pens (either aqueous or nonaqueous based inks), offset printing such as lithographic, gravure and intaglio printing, and printing or copying by electrographic, xerographic, color or black and white electrophotographic (using either liquid or dry toners), and laser printing.

As is well understood in the art, the design of such a recording medium presents great difficulties for accurate, high-quality reproductions because the various imaging technologies in many ways require diametrically opposed chemical and physical properties, especially for the receiving layer. As an example, ink-jet receiving layers need to be porous and inherently soft to allow for rapid absorption of the ink solvent, while electrophotographic receiving layers must be sufficiently hard to survive the heat treatment necessary to fuse the toner particles. Some imaging inks are hydrophobic in nature while others are aqueous based, therefore the extent of image spreading and rates of absorption will be vastly different unless careful design of the image receiving layer is achieved.

The term "digital identification documents" as used in this invention is meant to cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, the first indicium on the core layer of the present identification document (and the second indicium discussed below) may be partially or wholly in the form of a marking visible only under non-visible radiation. Markings comprising, for example, a visible "dummy" image superposed over a non-visible "real" image intended to be machine read may also be used.

In current ink-jet printing applications, several inks (typically black, cyan, magenta, and yellow) are used to print indicia such as textual and graphic information on a printing medium, typically ordinary paper. The typical ink-jet inks are primarily composed of a high boiling solvent or are aqueous based, and contain a colorant that may be either a dye or pigment dispersion. Pigment dispersions are preferred since the dyes are highly soluble and tend to smear upon handling. Pigment dispersions offer improved water and smear resistance as well as better light stability.

The aqueous-based inks generally also contain a polyhydric alcohol to prevent nozzle clogging, and may contain various adjuvants. Such inks and ordinary paper are well suited for desk-top publishing as currently practiced, wherein only a small portion of the paper receives printed text and graphic information. In order to provide "photoreal" ink-jet prints recording media have been designed wherein a highly glossy support is coated with a transparent polymeric material that allows limited lateral diffusion of the image but still provides rapid absorption of the solvent.

Examples of typical image receiving materials include modified polyethylene oxides, gelatin, polyurethane, polyacrylates, polyesters, polyamides, polyurethane/urea resins, hydrophilic acrylic resin, epoxies and mixtures thereof. Most preferred are modified polyethyleneoxides, polyurethane, polyurethane/urea, hydroxyethyl cellulose (HEC), cationic polyurethanes and polyvinyl pyrrolidinone (PVP)/vinyl acetate (VA) copolymers. These receiving layers may be hardened with such standard cross-linking agents as formaldehyde and formaldehyde generating compounds such as oxazolidines, activated double bonded compounds such as vinyl sulfones, or acrylates, aziridines, and epoxides. It is also known to coat an underlayer beneath the image receiving layer in order to act as a reservoir for the absorbed solvent, thereby increasing the rate of solvent absorption and reducing smearing.

The substrate, also commonly known as a support or base, is a material having sufficient stiffness and dimensional stability to support a printed image without having the image distort or misalign, and sufficient water resistance that it can be exposed to an aqueous ink without warping or shrinkage. The material also must withstand heat and pressure applied during the further lamination steps described below. The substrate can be of any effective thickness. The support typically has a thickness of about 25 to about 250 micrometers (1.0 to 10 mils), preferably about 50 to 200 micrometers (2 to 8 mils).

The recording media of the present invention comprise a substrate and an image receiving coating layer on one or both surfaces of the substrate. Any suitable substrate can be employed.

Usable examples of the base material sheets in the image recording sheets according to the present invention can include paper, plastic films, glass, fabrics, wood, and metal in either roll or sheet format. Exemplary paper media include high-quality paper (i.e., wood-free paper), medium-quality paper (i.e., paper made of at least 70% chemical pulp and the remainder of groundwood pulp), coated paper, cast-coated paper or synthetic paper treated to be water-resistant.

Suitable plastic materials include polymeric films such as polyethylene terephthalate and polyethylene naphthanate, polyamides, poly (methyl methacrylate), polycarbonates, fluoropolymers, polyacetals, cellulose triacetate, polycarbonate, poly(vinyl chloride), polyolefins such as polypropylene, polystyrene, and polyethylene sheets of 50–250 μm in thickness. Polyethylene terephthalate films are a preferred support material.

Examples include transparent materials such as polyester, polyethylene naphthanates, polycarbonates, polysulfones, polyether sulfones, such as those prepared from 4,4'-diphenyl ether, those prepared from disulfonyl chloride, those prepared from biphenylene, poly (arylene sulfones), such as those prepared from cross-linked poly(arylene ether ketone sulfones), cellulose triacetate, polyvinylchloride, cellophane, polyvinyl fluoride, polyimides, and the like, with polyester such as Mylar® being preferred in view of its availability and relatively low cost. The substrate can also be opaque, including opaque plastics and filled polymers.

Preferred films include, mono- and biaxially-oriented films made from polypropylene, polyester, polyamide and the like due to their superior dynamic property, heat resistance, and transparency. In particular, biaxially-oriented polyester films are superior in mechanical strength, heat resistance, chemical resistance, and dimensional stability so that they have been used in a wide range of other applications, such as a base film for magnetic tape, an insulating tape, a photographic film, a tracing film, a food packaging film and the like. On the other hand, since polyester films generally have poor adhesive property, it is common practice to subject a polyester film to a corona discharge surface treatment or to form an anchor or primer coating layer when additional layers comprising organic thermoplastic resins or elastomers are going to be applied to the surface of the polyester film.

The polyester resins that can be used in the present invention are those prepared by polycondensation of an aromatic dicarboxylic acid or an ester thereof, such as terephthalic acid, isophthalic acid or naphthalenedicarboxylic acid, with a glycol such as ethylene glycol, diethylene glycol, 1,4-butanediol or neopentyl glycol. These polyester resins can be prepared, for example, by direct reaction of an aromatic dicarboxylic acid with a glycol, or by ester interchange of an aromatic dicarboxylic acid alkyl ester with a glycol and then polycondensation, or by polycondensation of an aromatic dicarboxylic acid diglycol ester. Typical examples of the polyesters include polyethylene terephthalate, polyethylenebutylene terephthalate and polyethylene-2,6-naphthalate. These polyesters may be homopolymers or copolymers with additional monomers. In any case, preferred polyesters which can be used in the present invention contain ethylene terephthalate units, butylene terephthalate units or ethylene-2,6-naphthalate units at a ratio of 70 mol % or higher, preferably 80 mol % or higher, and more preferably 90 mol % or higher. The preferred polyester is amorphous or biaxially oriented poly(ethylene terephthalate).

For the recording media of the present invention, void-containing films may also be used as the base film, more preferably void-containing polyester films. The void-containing films may be either single-layer films or laminated composite films.

The void-containing film which can be used in the present invention should have an apparent specific gravity of from 0.5 to 1.3 both inclusive, preferably from 0.9 to 1.3 both inclusive, and more preferably from 1.05 to 1.27 both inclusive. If the apparent specific gravity is lower than 0.5, the content of voids in the film is so high that the film shows a marked lowering in strength and some cracks or wrinkles are liable to occur on the film surface. In contrast, if the apparent specific gravity exceeds 1.3, the content of voids in the film is so low that physical properties attained by the incorporation of voids, such as cushion effect and flexibility, are deteriorated. The method for lowering the apparent specific gravity is not particularly limited but, the use of recording polyester films containing microvoids in the inside is preferred, where films can be prepared by mixing a polyester resin with any resin incompatible in the polyester resin and/or with any inert particulate matter, followed by extrusion and then at least one-way orientation. In this case, the incompatible resin and inert particulate matter may be any of those known in the art. Polystyrene resins and inorganic particles such as titanium dioxide powder and calcium carbonate powder are preferred.

Rubber substrates comprising such materials as natural rubber or synthetic rubbers are all useful in the present invention. Rubber materials in the present invention are defined by those materials having a Tg below about 400° C. Synthetic rubbers include: butadiene rubber, chloroprene rubber, silicone rubbers, neoprenes, polysulfides, polyacrylate rubbers, epichlorohydrin rubbers, fluoroelastomers, chlorosulfonated polyethylene, halogenated butyl rubber, chlorinated polyethylene rubber, polyurethane rubber, isobutylene-isoprene rubber, nitrile-butadiene rubber, ethylene-propylene copolymer, ethylene-propylene-diene terpolymer, styrene-butadiene rubber, and thermoplastic rubbers. Styrene-butadiene rubber is highly preferred. To achieve high reflectivity the rubber substrate can optionally have beads impregnated into the rubber matrix or embedded in the side to be coated and imaged. Especially preferred are glass beads of a size range between submicron and 50 micron. The glass beads can be composed of all compositions of glass as is known in the art, particularly preferred are silicate-containing glasses. In a preferred embodiment of the present invention, the substrate 10 is composed of a glass bead impregnated SBR sheet approximately less than 35 mil thick, comprising beads being approximately 30 microns in diameter and with a coverage of between about 1 to about 60 gm/m². Most preferred coverage of glass beads is between about 3 and about 25 gm/m².

Thin metal sheets may be selected, as well as metallized polymeric films selected from those described above are also within the scope of the present invention.

The substrate may be colored and can have components, such as antihalation dyes incorporated therein to meet the needs of specific applications. In a preferred embodiment the support material is opaque and has sufficient flexibility to be bent without cracking or causing delamination of overcoated layers. The base support may optionally contain a pretreatment to its surface to promote such properties as adhesion between the applied coatings and base or an anti-static agent to dissipate electrostatic buildup, or the base may be supplied without any pretreatment coating. Prior to coating, the support may be subjected to corona discharge treatment, plasma treatment, undercoating treatment, heat treatment, dust removing treatment, metal vacuum deposition treatment, or alkali treatment.

In another preferred embodiment of the present invention, the support layer is printed with indicia or embossed with a holographic image that can be detected through later-coated transparent layers.

In other preferred embodiments of the present invention, other security features containing crucial data relating to the identification of the bearer are often covertly applied to the inventive laminate in encrypted form for data verification in a magnetic stripe, bar code, radio frequency module, or integrated circuit chip. This information may be imaged onto the later described image recording layers 50 and 50a (FIG. 2). In a highly preferred embodiment, invariant data is imaged onto one layer while variant (individualized) data is imaged onto the second layer.

If the present invention is to be used as an identity card or a credit card, it is highly desirable that the base allow for bending forces without cracking or delaminating.

In certain embodiments of the present invention, it is desirable to provide an adhesive layer to the distal side of the substrate relative to the image receiving side. For example, if the imaged product is to be used as a tag for license plates or to be affixed to other objects it is beneficial to provide an adhesive surface. The adhesive layer can furthermore have a protective layer that is removable by peeling so that premature adhesion to undesirable articles is prevented. This is highly desirable even within the present manufacturing process especially the later lamination step which requires, as shown in FIG. 3, the intermediate articles 100 and 200 to be pressed together between rollers or platen 400 and 400a at room temperature or elevated temperatures and atmospheric or elevated pressures.

As shown in FIG. 1, an optional primer also known as an anchoring layer 20 can be applied if necessary, providing adhesion of overcoated layers to the base material sheet or roll 10. The primer composition preferably should be transparent, especially in the embodiment where high reflectivity is required from the base support 10. It is also within the scope of the present invention to allow the support to optionally be corona treated prior to applying either a primer layer 20 or a later described undercoat layer 30.

An anchor or primer layer 20 may be used to ensure adequate adhesion of the support 10 to any layers coated onto its major lateral surfaces. The term "anchor layer," as employed in the art, means a layer that is adhesively bonded to the layers on both sides of it. Adhesive materials for bonding different types of materials are well known in the art. Any conventional adhesive material can be used in the anchor layer, or layers, providing that it is not adversely affected by the later coating, imaging, and laminating steps. Representative materials include ethylene/vinyl acetate copolymers, ethylene/acrylic acid copolymers, vinyl chloride/vinyl acetate copolymers, vinyl chloride/vinylidene chloride copolymers, thermoplastic polyamides, and the like. The choice of adhesive will depend on the compositions of the underlayer 30 and the support 10 (FIG. 1). The anchor layer or layers may contain materials such as antistats, colorants, antihalation dyes, optical brighteners, surfactants, plasticizers, coating aids, and the like. The anchor layer(s) generally has a thickness in the range of 0.01 to 10 micrometers, preferably 0.05 to 5 micrometers.

As such anchor coating agent, a number of materials have been proposed, among which are water soluble or water dispersible polyester or acrylic resin to be used for a film having comparatively higher polarity, which is typically a polyester film (e.g., see U.S. Pat. No. 4,098,952, issued to Kelly et al. on Jul. 4, 1978 for COATED POLYESTER FILM ASSEMBLY WITH A PRIMER LAYER).

In the present invention, the preferred primer layer coating materials include ethylene vinyl acetate and ethylene acrylic acid polymers. Another preferred primer layer composition is methyl methacrylate/2-hydroxyethyl methacrylate graft.

Other optional coating layers can be applied after the primer layer. These include such layers as a lubricant layer, which improves the coefficient of friction. They can be applied to the back (lower) side of the base material sheet, said back side being on the non-imaged side of the support. An anticurl layer can also be coated on the backside of the support.

As shown in FIG. 1, an undercoat layer 30 separates the support surface from the image-receiving layer 50. The undercoat layer may be either a hydrophilic polymer or hydrophobic polymer or a combination of both. These polymers are film-forming plastics and are resinous agents that are considered binders, which contribute several important characteristics to the coating composition. The binders provide adhesion to the base support, thicken the coating composition, serve as a carrier for optional particulate fillers, and among other functions, provide absorptive properties for printing/imaging solvents. In the present invention this layer also must be readily softened at elevated temperatures in order to provide irreversible bonding during later lamination manufacturing steps. Although not a requirement, it is highly preferred that the undercoat layer be provided from essentially an aqueous media, the polymer either being soluble within the aqueous media or in the form of a latex or dispersion particle. Typical dispersion particle size ranges from submicron to about 80 micron. During the coating and drying of this layer, the dispersion particles will coalesce to provide a clear, continuous film. It is also possible to employ polymers that can be readily miscible in alcohol, ketones, and/or glycol ether solvent systems however solvent capture, recovery, reuse become problematic.

Desirable hydrophilic, water-soluble polymers include polyvinyl pyrrolidone and its copolymers, including: a) polyvinyl pyrrolidone, polyvinyl pyrrolidone/polyvinyl acetate copolymers, polyvinyl pyrrolidone/styrene, polyvinyl pyrrolidone/dimethylaminoethylmethacrylate copolymers; b) polyacrylic acid and its copolymers, including polyacrylic acid, and polyvinyl pyrrolidone/polyacrylic acid; c) polyvinyl acetal, or polyvinyl butyral; and d) polyvinyl alcohol. These hydrophilic, water soluble polymers are preferred due to their absorbency of the ink-jet printer's ink vehicle. A desirable hydrophilic, water-soluble polymer is polyvinylpyrrolidone dimethylaminoethyl-methacrylate (a PVP copolymer).

The hydrophilic, water-soluble polymer of the present invention is generally present in the amount from approximately 5 to approximately 60 percent by weight of the total dried coating. Desirably, the hydrophilic, water-soluble polymer is generally present in the amount from approximately 15 percent to approximately 45 percent.

Any resin having hydrophobic properties can be used as the hydrophobic resin contained in the undercoat layer 30. Examples of the hydrophobic resin include, but are not limited to, acrylic resins, polyester resins, polyurethane resins, styrene-acrylic copolymer resins, styrene-butadiene copolymer resins, acrylonitrile-butadiene copolymer resins, vinyl acetate resins, vinyl chloride resins, ethylene-vinyl acetate copolymer resins, vinyl chloride-vinyl acetate copolymer resins, silicone resins, nitrocellulose resins, alkyd resins, polyvinyl butyral resins, polycarbonate resins. Resins suitable for use in the present invention must have Tg below about 60° C.

In a preferred embodiment the undercoat comprises a hydrophobic polyurethane layer provided from an aqueous polyurethane dispersion (PUD). The type of polyurethane employed in the present invention is not critical. Aliphatic and aromatic types are suitable although the aliphatic type is preferred particularly since it produces a non-yellowing film. The terms "aliphatic" and "aromatic" are used in the conventional sense in the art and refer to the "hard" segments of the polymer that are provided by aliphatic or aromatic isocyanates or diols. The PUD can be either anionic, nonionic, or cationic but anionic and nonionic PUDs are preferred. Preferably, what is known in the art as a water-borne polyurethane is employed. Such polyurethane compositions are not solely organic solvent solutions but rather are made up of solvent systems that include a predominant amount of water. Thus, a typical water-borne polyurethane would consist of 30% (solids) polyurethane, 15% N-methylpyrrolidone, and 55% water.

Preferred in the current invention are nonionic and anionic polyurethane dispersions. It should be understood, however, that polyurethanes in organic solvents can be employed in the present invention provided the solvent is selected to avoid an incompatibility with the specified water-dispersible polymer and that the solvent does not etch or otherwise attack the substrate layer. It is critical that for the current invention the Tg of the polyurethane resins selected for use in the undercoat have Tg values less than approximately 60° C. A preferred adhesive material is based on aqueous polyurethane dispersions as described in U.S. Pat. No. 5,494,960, previously referenced, and U.S. Pat. No. 5,637,639, issued to Duan et al. on Jun. 10, 1997 for REDUCED SOLVENT PROCESS FOR PREPARATION OF AQUEOUS POLYURETHANE DISPERSIONS WITH IMPROVED HEAT- AND WATER-RESISTANCE.

PUDs serve a unique and dual function in the present invention. As an underlayer to the image-recording layer they act as a reservoir to absorb solvent during the imaging process. This allows the image-recording layer 50 to rapidly absorb the solvent thereby reducing drying time. Secondly, in the later lamination step, the PUD will melt, thereby permanently affixing the image-recording layer 50 to the substrate 10, FIG. 1. In this manner the PUD acts as a thermal adhesive. Significantly and most importantly, the melting of the PUD maintains the image in its original geometry (i.e., there is no distortion of the applied image).

In other embodiments of the invention it is possible to further employ water-based polyisocyanates as catalyst hardeners to cure the water-based polyurethane dispersions described above. The polyisocyanate can be formulated within the underlayer 30 or as a separate layer adjacent to the underlayer 30.

If higher Tg polyurethane resins are selected then they must be mixed with compatible polymer resin plasticizers, having lower Tg, to form a clear, transparent underlayer 30. Such preferred plasticizers known in the art will not diffuse into the later formed imaging layer 50 (FIG. 1). Concentrations of these plasticizers can be up to about 16% the weight of the undercoat resin coat weight. Examples of useful plasticizers include DOP, PEG, glycerol, trimethylol propane, and other plasticizers known in the industry. Additionally, optional tackifiers may be incorporated into the plasticizer formulation to improve flexibility and heat sealability.

The undercoat layer 30 preferably is transparent to allow maximum reflectivity from the base support 10 (FIG. 1). In one preferred embodiment of the present invention, the use of polymeric beads such as ethylene-acrylic acid copolymer can be added to the undercoat layer 30. The beads must have a Tg that will allow the beads to melt into the undercoat layer during the later laminating step and also not impair the transparency of the undercoat layer. It has been demonstrated when these conditions are met, improved adhesiveness to adjacent layers 20 and 40 can be achieved. A preferred addition range for these beads is 0 to about 50 gm/m². The use of polymeric beads as described in this layer can also be beneficial when used in other later described layers.

An optional barrier layer, preferably composed of polyurethane, separates the image-receiving layer 50 from the undercoat layer 30. The polyurethane for this layer is provided from a solvent-based polyurethane latex.

The function of this barrier layer 40 is to protect the undercoat layer 30 and the support 10 from attack by solvents from later-applied solvent-based coatings and imaging formulations. Organic solvents which can be used in dispersion, kneading, or coating in the present invention include: ketones such as acetone, methyl ethyl ketone, methyl isobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, ethyl acetate, butyl acetate, isobutyl acetate, isopropyl acetate, ethyl lactate, and acetic acid glycol monoethyl ether; ethers such as diethyl ether, tetrahydrofuran, glycol dimethyl ether, glycol monoethyl ether, and dioxane; aromatic hydrocarbons such as benzene, toluene, xylene, cresol, chlorobenzene, and styrene; chlorinated hydrocarbons such as methylene chloride, ethylene chloride, carbon tetrachloride, chloroform, ethylene chlorohydrin, and dichlorobenzene; and N,N-dimethylformaldehyde. These solvents can be used in any desired proportions.

The barrier layer is applied as a very thin coating, typically 1 to 60 gm/m², and preferably 1 to 10 gm/m² and is dried rapidly to prevent disruption of the underlayer 30. Disruption would generally cause unfavorable levels of haze thereby reducing the reflectivity from the glass beads located in the base support 10 (FIG. 1).

Preferred solvent-based polymeric compositions for the current invention include polyurethane dispersions, composed of a non-reactive linear polyurethane lacquer dissolved in a mixture of organic solvents. Other lacquers or polyurethanes possessing approximately the same tensile strength and flexibility as the protective layer can also be employed.

The image-recording layer 50 shown in FIG. 1 is constructed of an essentially hydrophilic polymer composition having a balance of properties. The layer 50 traps the imaging material applied during the imaging process. If the imaging is performed via ink-jet application, the ink, whether from organic dye or from pigment contained in the ink, is trapped in layer 50. In this situation the image-recording layer 50 can be referred to as an ink-receiving layer 50. Layer 50 however is sufficiently permeable to the ink carrier medium (i.e., water that optionally contains liquid organic additives) that the carrier quickly passes through the ink-receiving layer 50 to the water-absorbing layer 30. Rapid transfer of the aqueous carrier is important to achieve desired printing speeds.

It is desirable that the image-recording layer 50 not be so tacky at ambient temperatures that it presents a handling problem. However, materials should be avoided that are so slippery the material presents a registration problem during lamination to the protective construct. For many applications, it will be desirable to employ an image-receiving layer that is scratch and abrasion-resistant when wet or dry, and is resistant to cracking or embrittlement over time.

The present invention carefully balances two critical parameters. It is imperative the image be formed in a manner allowing rapid uptake of any non-imaging solvent (i.e., the image receiving layer must be highly absorbent); therefore, it cannot be too "hard." Alternately, this layer must also survive the later lamination step requiring elevated temperatures and cannot be too soft. In addition, when the present invention is used in combination with ink-jet inks, it is highly preferred that the ink-jet dyes not diffuse laterally through the layer. This requirement can be fulfilled by employing optional cationic sites to the polymers comprising the image-recording layer 50.

In one embodiment the image-recording layer 50 comprises modified polyalkylene oxide polymers. The polyalkylene oxide portion of these polymers may be homopolymers, random or block heteropolymers comprising two or more alkylene oxide monomers such as ethylene oxide or propylene oxide. In this invention the molecular weight range for useful polyethylene oxide polymers is approximately 50,000 to about 3,000,000 Daltons. Preferred molecular weights are between about 70,000 and 1,000,000 Daltons, and most preferred molecular weights are between 100,000 and 200,000 Daltons. Modification to these polymers is achieved by reacting the polyalkylene oxide polymers with reactive siloxanes to convert at least a portion of the end capped hydroxyl functionalities on the polyalkylene oxide polymers.

In a preferred embodiment of the present invention the use of nonionic surfactants such as glycidyl oils can be used as emulsifying agents to form the modified polyalkylene oxide polymers. Materials of this type are described in U.S. Pat. No. 6,143,419 issued to Hanada, et al. on Nov. 7, 2000 for INK-JET RECORDING SHEET COMPRISING A MOLECULE CONTAINING TERTIARY AMINO GROUPS AND POLYSILOXANE SEGMENTS. It has been determined that to achieve the combination of desired effects described above, the siloxane-modified polyoxyalkylene oxide materials of the present invention must have a Tg between about 56° C. and 130° C. This is typically achieved by having the ratio of siloxane moiety to alkyleneoxide be approximately 0.5% to 20% of the entire resin, preferably between 10% and 20%.

In a most highly preferred embodiment of the present invention the siloxane functionality also can be converted in later steps into cationic moieties. Such groups include isocyanate or carboxylic acids that upon reaction with amines can generate quaternary ammonium salts. When attached to the siloxane derivatized polyalkylene oxide, these quaternary ammonium salts provide sites for ionically complexing with anioinic ink-jet dyes preventing lateral diffusion and thereby providing high quality, high resolution images.

The siloxane-modified polyethylene oxide polymers of the present invention should not be confused with prior art using modified polyalkylene glycols (MPEGs) that typically act as plasticizers, or specialty oils to modulate flow, viscosity, leveling, and drying characteristics of the coating composition. Prior art MPEGs typically comprise lower weight PEG materials with molecular weights from approximately 200 to 10,000 and have also been used as nonionic surfactants to facilitate coating uniformity, and are designed to consist of a high ratio of siloxane groups compared to alkylene oxide groups. Therefore, these prior art MPEGs are typically hydrophobic and have a slight hydrophilicity due to the few alkylene oxide groups.

In the current invention the modified polyethylene oxides are used for an entirely different function and do not behave as the prior art materials. Specifically, the present modified polyethylene oxides as used in the present invention are applied in a solvent formulation and the function of the thus coated modified polyethylene oxide polymers is to act as a receiving or recording media for the later imaging process. In this case the desire is to have a predominantly hydrophilic material that will allow rapid aqueous solvent absorption yet be marginally hydrophobic in order to entrap the imaging material. Therefore, the ratio of siloxane to alkylene oxide moieties is intentionally kept to a minimum. Unexpectedly, these modified polyethylene oxide materials provide means to affix organic dyes and pigments, inorganic pigments, or toner particles. In this manner, highly reproducible images can be generated. Furthermore, of significant importance to the present invention is that the imaged polyethylene oxide image recording layer 50 (FIG. 1) faithfully reproduces an applied image and maintains that faithful reproduction through the later laminating process.

As the resin component constituting the ink-receiving layer, the resin in the first aspect, or the resin in the second aspect can be used singly. Depending on the composition of an ink-jet recording ink, a water-soluble polymer may also be used in combination with the above-described resin with a view to additionally imparting hydrophilicity and/or water absorbency or to adjusting the same.

Usable examples of the water-soluble polymer can include polyvinyl alcohol, modified polyvinyl alcohol, hydroxyethylcellulose, CMC, cellulose derivatives, polyvinylpyrrolidone, starch, cationized starch, gelatin, casein, and acrylic acid polymers.

Further, a hydrophobic polymer may also be used in combination with the above-described resin with a view to further imparting water-proofness and durability to the ink-receiving layer and printed marks. Usable examples of the hydrophobic polymer can include commonly-used synthetic resins such as polyester resins, poly(vinyl chloride) resin, polystyrene resin, poly(methyl methacrylate) resin, polycarbonate resins, polyurethane resins, vinyl chloride-vinyl acetate copolymer resins, acrylonitrile-styrene copolymer resins, polyvinyl butyral resin, polyamide resins, epoxy resins, urea resins, and melamine resins.

In a highly preferred embodiment of the present invention, the coating formulation of the image-recording layer comprises a mixture of siloxane-modified polyalkylene oxide (described above), and an acrylic acid/acrylate copolymer. The amount of the acrylic acid/acrylate copolymer can range from approximately 3 to 30 weight/weight percent in the image-recording layer 50.

The image-recording layer 50 typically has a thickness of 0.1 to 10 mils, preferably about 0.6 to 0.8 mils, and can optionally contain at least 20% adhesive having the properties described for the undercoat layer 30, based on total weight of the layer. Preferably the adhesive will constitute at least 80% of the layer.

The image-recording layer 50 may optionally be toughened with 0.5 to about 8% by weight of known cross-linking agents. A cross-linking agent selected from the group consisting of aldehyde compounds, ketone compounds, a triazine compound, reactive halogen-containing compounds, divinylsulfone, a carbamoyl pyridinium compound, reactive olefin-containing compounds, N-methylol compounds, isocyanates, aziridine compounds, carbodiimides, epoxy compounds, a halogencarboxyaldehyde, a dioxane derivative, chromium alum, potash alum, zirconium sulfate and boric acid, hexamethoxymethyl melamine, methylated melamine-formaldehyde, methylated urea-formaldehyde, cationic urea-formaldehyde, cationic polyamine-epichlorohydrin, glyoxal-urea resin, poly (aziridine), poly (acrylamide), poly (N,N-dimethyl acrylamide), acrylamide-acrylic acid copolymer, poly (2-acrylamido-2-methyl propane sulfonic acid), poly (N,N-dimethyl-3,5-dimethylene piperidinium chloride), poly (methylene-guanidine) hydrochloride, poly (ethylene imine) poly (ethylene imine) epichlorohydrin, poly (ethylene imine) ethoxylated, and glutaraldehyde.

The cross-linking agents can be mixed with the image-recording coating formulation prior, simultaneous with, or as a post treatment after coating. Another useful family of cross-linking agents is polyepoxides.

Various polymeric isocyanates can also be used as cross-linking agents. In particular, MEI can be used as a cross-linking agent, in this case water (primarily from the ink formulations), can assist in forming urea cross-links.

Other preferred hardening agents are polyvalent metal salts of organic acids, e.g., particles consisting of aluminum, zirconium, titanium and mixtures thereof. Most preferred is zirconium propionate.

When forming the image-recording layer 50 of the present invention, it can also contain certain additional modifying ingredients, such as adhesion promoters, matte particles, surfactants, viscosity modifiers, mordants, and like materials, provided that such additives do not adversely affect the ink or toner-receptivity of the layer.

As fillers or pigments and resin particles for use in the image recording layer, one or more pigments and resin particles can be suitably chosen in accordance with the quality design of the ink-jet recording sheet from known pigments and resin particles, e.g., mineral or porous pigments such as kaolin, delaminated kaolin, aluminum hydroxide, silica, diatomaceous earth, calcium carbonate, talc, titanium oxide, calcium sulfate, barium sulfate, zinc oxide, alumina, calcium silicate, magnesium silicate, colloidal silica, zeolite, bentonite, sericite and lithopone; and fine particles, porous fine particles, hollow particles and the like of polystyrene resin, urea resins, acrylic resins, melamine resins, benzoguanamine resin, polyurethane resins, and other organic pigments. In this case, these pigments and resin particles are added in a range from 0 to 95 wt. %, preferably from 10 to 90 wt. % based on the whole solid content of the ink-receiving layer.

Besides the resin and pigments, various additives can also be incorporated in the ink-recording layer as needed. These additives can include thickening agents, parting agents, penetrating agents, wetting agents, thermal gelling agents, sizing agents, defoaming agents, foam suppressers, blowing agents, coloring matters, fluorescent whiteners, ultraviolet absorbers, oxidation inhibitors, quenchers, antiseptic agents, antistatic agents, cross-linking agents, dispersants, lubricants, plasticizers, pH regulators, flow improvers, setting promoters, and waterproofing agents, humectant, UV absorber, polymeric dispersant, defoamer, mold inhibitor, latex, and dye mordant.

In an embodiment of the present invention, the image recording layer is a cast-coated layer prepared by coating a coating liquid for the cast-coated layer on a surface of the undercoated substrate sheet; press-casting, while the resultant coating liquid layer on the substrate sheet surface is kept in a wetted condition, the coating liquid layer onto a mirror-finished peripheral surface of a casting drum; drying the press-casted coating liquid layer on the casting drum; and separating the resultant laminate from the casting drum.

The combination of substrate 10 and layers 20, 30, 40, 50, and 11 comprise intermediate article 100 as depicted in FIG. 1.

As shown in FIG. 2, a polymeric plastic film 80 is coated with an adhesive material forming a composite. The material for the protective plastic overlayer 80 can be selected from the polymeric materials described for the substrate 10. The plastic film 80 for the present invention must be transparent. Prior to coating with adhesive material 60 (described later)

the film 80 can be optionally corona or plasma treated to improve adhesion and further can be treated with an antistat. An optional primer layer 70 can also be applied prior to overcoating with the adhesive layer 60. The composition of the primer layer 70 can be selected independently from the primers described for layer 20. In a preferred embodiment the plastic overlayer has been previously embossed to form holographic images even under diffuse lighting.

The protective layer 80 should be resistant to scratching and cracking due to bending as well as to environmental components and contaminants. It is permanently adhered to ink-receptive layer 50 through an adhesive layer 60 (described below) and can be applied by a temporary carrier or transport layer 90 affixed to the backside of the protective film 80. Protective layer 80 is transparent in at least one region of the visible spectrum and typically is transparent throughout the ultraviolet, visible, and/or infrared spectral regions.

Protective layer 80 can consist essentially of a fluoropolymer, a saran, polyvinyl chloride, a polyester or an acrylic polymer. Fluoropolymer refers to a polymer whose structure comprises fluorine atoms covalently bonded to carbon atoms. As is well known to those skilled in the art, such polymers can be prepared by polymerization of fluorinated monomers, such as tetrafluoroethylene, hexafluoropropylene, vinylidene fluoride, perfluorovinyl ethers, and vinyl fluoride, with each other and/or with non-fluorinated monomers, such as ethylene. In order to prevent cracking over time, the protective layer may also contain plasticizers as are known in the art. Furthermore, the thickness of the protective layer is preferably selected to be as thin as possible, typically in the range of 0.1 microns to about 30 microns in order to withstand bending forces yet thick enough to maintain integrity from chemical and physical impairment. Preferably, the thickness of the protective layer 80 is between approximately 0.5 and 10 gm/m$^2$.

Protective layer 80 may also contain a photostabilizer to protect the underlying image from damage by ambient ultra-violet light. Photostabilizers are well known in the art and include 2-hydroxybenzophenones, oxalanilides, aryl esters and the like, and hindered amine light stabilizers, such as bis(2,2,6,6-tetramethyl-4-piperidinyl)sebacate, and combinations thereof. Optical brighteners that may be used to enhance the visual appearance of the imaged layer may be any conventional, compatible optical brightener. To prevent distortion of the underlying image when it is viewed through the protective layer, materials that do not absorb strongly in the visible region of the spectrum are preferred.

At times it is desired to provide a range of surface finishes from highly glossy to matte. This may be done by controlling the outermost surface of protective layer 80 (FIG. 2). This surface replicates the surface of the temporary carrier layer 90 with which it is in contact prior to lamination and separation. If the surface of the temporary carrier layer has a rough texture or contains any other relief pattern, the image will appear matte. If the surface of the temporary carrier layer is smooth, the image will appear glossy.

Alternatively, protective layer 80 may be provided with a matte surface. This matte surface can be obtained by including in the layer particles sufficiently large to give surface irregularities to the layer. Particles of average diameter in the range of approximately 1 micron to 15 micron are suitable. This layer typically has a thickness in the range of approximately 0.5 micron to 10 micron and preferably in the range of approximately 1 micron to 4 micron. A preferred matting agent is amorphous silica.

Suitable adhesives are well known in the art. The exact choice will depend on the image-recording layer and the desired permanent support. Examples of suitable adhesives include polyester resins, polyvinyl alcohol homopolymers and copolymers (e.g., with, methyl methacrylate, or vinyl acetate), polyvinyl pyrrolidone, and blends thereof, and copolymers of vinyl acetate with ethylene and/or vinyl chloride.

An optional second image recording layer 50a can be laminated or overcoated to the adhesive layer 60 described above. The second image-recording layer is typically composed of materials described for image recording layer 50. The material selected for the two imaging layers 50 and 50a can be independently selected but they must be compatible with each other as they will be in intimate contact after the later lamination steps. It is desirable that the imaging processes for each imaging layer 50 and 50a may be either the same or different, for example either one or both might be imaged by an ink-jet application or imaged by an electrophotographic copier. In a preferred embodiment both imaging layers 50 and 50a are composed of the same material. In a most preferred embodiment the image-recording layer comprises a modified polyethylene oxide material.

The selection of the resin material in the adhesion layer and its corresponding Tg and second image recording material will dictate the mode of imaging. For example, higher Tg materials will be required for the imaging in an electrographic copier due to the temperatures necessary to fuse the tone particles. Under these conditions it would be unacceptable for the adhesive material in the undercoat layer 30 to melt prior to the later lamination process.

In a preferred embodiment, the thin upper layer 50 or 50a further comprises organic acid salts of polyethyleneimine for optimization of other properties such as drytime, smudging of the images, image brightness, color quality, tack and bleeding.

The thickness of the image recording layers 50 and 50a as described above may preferably be from 0.5 to 50 g/m$^2$ in terms of dry weight, with 3 to 20 g/m$^2$ or so being more preferred. If the thickness of the image recording or ink-receiving layer is smaller than 1 g/m$^2$, the ink-receiving layer cannot exhibit sufficient ink absorbency. Even if the thickness exceeds 50 g/m$^2$, no additional beneficial effects are noted. Accordingly, such an excessively large thickness is not economical and, moreover, tends to induce fold-cracking, curling, etc. of the ink-receiving layer.

An aspect of the present invention that is especially critical to its success is requiring that the two image recording layers 50 and 50a readily and accurately affix the applied image whether the image be digital or analog, and either mechanically or manually applied. Furthermore, the rendered image must survive lamination conditions typically performed at elevated temperatures.

The present invention allows for the imaging process to be selected from a broad range of known imaging processes. In general, such methods include both mechanical and manual applications either in a digital or analog mode, including but not limited to: ink-jet, electrographic, thermal transfer, dye diffusion transfer, thermographic, and conventional printing, or manually applied with such materials as paint, ink, toner, pigment, or other colored compositions.

For the purposes of this invention, the integral element of the protective layer 80, optional primer layer 70, adhesive layer 60, and optional second image recording layer 50a is termed construct 200 (FIG. 2). While the integral element of the substrate 10, optional primer layer 20, underlayer 30, optional barrier layer 40, and image recording layer 50 is termed an intermediate composite 100 (FIG. 1).

It should be noted that when a second image-recording layer 50a is employed, the first image-recording layer 50 may optionally be eliminated or alternatively if recording layer 50 is employed then layer 50a may be eliminated. In this case the intermediate composite would only include the substrate 10, optional primer layer 20, underlayer 30, and optional barrier layer 40.

For the methods of forming the coated elements 100 and 200 of the present invention like the image-recording layer 50, undercoat layer 30, and all optional layers, ordinary coating methods such as extrusion, blade coater, air-knife coater, die coating, direct or reverse roll coater, curtain coater, Mayer wire wound rod coating, air doctor coating, squeeze coating, dip coating, reverse roll coating, transfer roll coating, gravure coating, kiss coating, cast coating, spray coating, bar coating, spin coating, etc. can be used.

In one embodiment of the present invention, a so-called wet-on-wet coating method in which a coating solution for an upper layer is applied to a lower layer before the lower layer has been dried. Such coatings can be made simultaneously at one coating station or sequentially at multiple coating stations in a single or multiple pass operation. Alternatively, the layers may be coated separately after being dried and optionally wound and unwound.

The drying methods for coatings of the inventive film include drying and solidifying by hot air, infrared rays, and the like.

A desirable method of producing the ink receiving media of the present invention is wire wound Mayer bar coating followed by oven and air-drying. After the coating, the thus-coated layers may be finished by using a calender such as a machine calender, supercalender or soft calender.

Subsequent to coating, drying, and imaging, the outermost layers of the construct 100 and the intermediate construct are brought into contact. For example, the exposed surfaces of 50 and 50a or 60 are brought into intimate contact and then heat is applied to laminate the two integral elements 100 and 200 to form an integral single laminate comprising sequentially from substrate 10, an optional primer layer 20, a binder layer 30, an optional barrier layer 40, an image receiving layer 50, an adhesive layer 60, an optional primer layer 70, and a plastic protective layer 80. In a most preferred embodiment, the substrate 10 comprises a rubber-based material having highly reflective glass beads on the coating surface, the optional primer layer 20 comprises EAA, EVA (from Tg −50° C. to 130° C.), surlyn, polyvinyl butral, polyester, polyurethane or blends thereof. The binder layer 30 comprises an aqueous-based polyurethane elastomer, the optional barrier layer 40 comprises a solvent based polyurethane elastomer, the image receiving layer 50 comprises a polyethyleneoxide diether, the adhesive layer 60 comprises polyurethane, the optional primer layer 70 comprises polyurethane or EVA or a blend thereof, and the plastic protective layer 80 comprises polyethylene terphthalate further comprising holographic images. These layers can be applied by conventional coating methods such as slot die or extrusion in single-layer or multiple-layer coating operations.

The lamination process comprises heating the construct 100 and the intermediate composite 200 at 150° F. to 800° F. for 0.5 seconds to 10 seconds. Lamination typically is performed at a laminating station separate from the imaging process (e.g., ink-jet printhead or electrographic copier.)

In summary, the present invention is designed to create an image that has a high degree of permanence, and can withstand intentional tampering that could otherwise generate illicitly altered copies. In this regard the invention has significant utility for personal identification cards, credit cards, and the like. Embodiments of this aspect of the invention essentially comprise one or two imaged layers laminated between an opaque support and a transparent protective surface. By the very nature of the design, materials of this type are weather and light fade resistant, making them suitable articles for outdoor display. In keeping with the aspect of security, one embodiment of the invention can be utilized for such applications as license plate tags. In this embodiment an adhesive material is placed on the backside of the support 10. Typically, this is achieved by having an inert transport covering on the backside of the support and having an adhesive material between the transport covering and the backside of the support 10. After imaging and lamination, the transport covering is removed to expose the adhesive backcoat on the support 10. The adhesive backcoat can then affix the laminated and imaged article to such objects as a license plate. If security is not a prime factor, the adhesive backcoat can be designed for facile removal so as to allow for frequent change, as might be the case in outdoor advertising.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An image-recording medium comprising:
  a) a substantially opaque support layer comprising an upper and a lower major lateral surface wherein said support layer further comprises reflective beads;
  b) a first polyurethane layer residing on said upper major lateral surface, said polyurethane layer comprising a topmost surface;
  c) an image receiving layer comprising a siloxane-modified polyalkylene oxide residing on said polyurethane topmost surface, said image receiving layer having a Tg>50° C. and having an outermost surface wherein said image receiving layer further comprises a cross-linking agent, and
  d) a second polyurethane layer residing between said first polyurethane layer and said image receiving layer.

2. The image-recording medium as recited in claim 1, wherein said support layer comprises a rubber composition.

3. The image-recording medium as recited in claim 1, wherein said support layer comprises an organic polymer film.

4. The image-recording medium as recited in claim 1, wherein said support layer comprises a coated paper.

5. The image-recording medium as recited in claim 4, wherein said coated paper comprises a cast coated paper.

6. The image-recording medium as recited in claim 1, wherein said support layer comprises a metal or metallized sheet.

7. The image-recording medium as recited in claim 1, further comprising a primer layer situated between said support upper major lateral surface and said first polyurethane layer.

8. The image-recording medium as recited in claim 1, wherein said first polyurethane layer is formed from an aqueous-based polyurethane formulation.

9. The image-recording medium as recited in claim 1, wherein said second polyurethane layer is formed from a solvent-based polyurethane formulation.

10. The image-recording medium as recited in claim 1, wherein said cross-linking agent comprises a zirconium propionate.

11. The image-recording medium as recited in claim 1, wherein said cross-linking agent comprises a poly functional aziridine compound.

12. The image-recording medium as recited in claim 1, wherein said reflective beads reside on said support upper major lateral surface.

13. The image-recording medium as recited in claim 1, wherein said beads comprise glass.

14. The image-recording medium as recited in claim 1, wherein said support comprises rubber.

15. The image-recording medium as recited in claim 14, wherein said rubber comprises styrene butadiene rubber.

16. The image-recording medium as recited in claim 1, further comprising an imaged area residing in said image receiving layer or on said image receiving outermost surface.

17. The image-recording medium as recited in claim 16, wherein said imaged area is provided by ink-jet printing, laser printing, electrophotographic printing, thermal transfer printing, lithographic printing.

18. The image-recording medium as recited in claim 16, further comprising:
a) an adhesive layer comprising upper and lower surfaces, said adhesive layer lower surface affixed to said image receiving outermost surface wherein said adhesive layer comprises ethylene vinylacetate polymer;
b) a transparent polymer protective layer residing on said adhesive upper surface and further comprising a primer layer residing between said adhesive layer and said protective layer and further comprising security devices within said receiving element.

19. The image-recording medium as recited in claim 18, further, comprising an imaged area residing in said adhesive layer or on said adhesive lower surface.

20. The image-recording medium as recited in claim 18, wherein said adhesive layer comprises ethylene acrylic acid polymer.

21. The image-recording medium as recited in claim 18, further comprising a primer layer residing between said adhesive layer and said protective layer.

22. The image-recording medium as recited in claim 21, wherein said polyvinyl acetate has a Tb between about −59° C. to about +20° C.

23. The image-recording medium as recited in claim 18, wherein said transparent polymer protective layer comprises a polyester polymer.

24. The image-recording medium as recited in claim 19, wherein said polyester polymer comprises polyethylene terphthalate.

25. The image-recording medium as recited in claim 18, further comprising security devices within said receiving element.

26. The image-recording medium as recited in claim 25, wherein said security device is selected from the group consisting of embossing, holographic elements, and computer chips.

27. The image-recording medium as recited in claim 26, wherein said security device comprises a bar code residing on said image receiving layer.

28. The image-recording medium as recited in claim 26, wherein said support layer, said image receiving layer, adhesive layer, protective layer, and any optional layers are bonded together in such a manner as to destroy said imaged areas should delamination be attempted.

29. The image-recording medium as recited in claim 1, further comprising an adhesive backing layer affixed to said substrate lower surface.

30. The image-recording medium as recited in claim 1, further comprising a magnetically encoded strip affixed to said substrate lower surface.

* * * * *

UNITED STATES PATENT AND TRADEMARK OFFICE
CERTIFICATE OF CORRECTION

PATENT NO. : 7,022,385 B1
APPLICATION NO. : 10/264848
DATED : April 4, 2006
INVENTOR(S) : Nasser Page 1 of 1

It is certified that error appears in the above-identified patent and that said Letters Patent is hereby corrected as shown below:

In column 5, line 25, delete "em" and insert -- µm --, therefor.

In column 14, line 45, delete "anioinic" and insert -- anionic --, therefor.

In column 21, line 42, in Claim 19, delete "further," and insert -- further --, therefor.

In column 22, line 8, in Claim 22, delete "Tb" and insert -- Tg --, therefor.

Signed and Sealed this

First Day of August, 2006

JON W. DUDAS
*Director of the United States Patent and Trademark Office*